United States Patent [19]

Cornelius

[11] Patent Number: 4,635,429

[45] Date of Patent: Jan. 13, 1987

[54] WINDROW YARD RAKE

[76] Inventor: George B. Cornelius, P.O. Box 332, Jefferson, Tex. 75657

[21] Appl. No.: 793,305

[22] Filed: Oct. 31, 1985

[51] Int. Cl.$^4$ ............................................. A01D 7/04
[52] U.S. Cl. ............................ 56/400.18; 56/400.14; 56/400.01; 172/611
[58] Field of Search .................... 56/400.01, 400.04, 400.14–400.20, 56/410, DIG. 21, 431; 172/611

[56] References Cited

U.S. PATENT DOCUMENTS

| | | | |
|---|---|---|---|
| 1,370,086 | 3/1921 | Callison | 56/400.19 |
| 1,469,957 | 10/1923 | Rich | 56/400.19 |
| 2,069,958 | 2/1937 | Kool | 56/400.14 |
| 3,952,490 | 4/1976 | Brookman | 56/400.14 |
| 4,157,119 | 6/1979 | Litchfield | 172/611 |

FOREIGN PATENT DOCUMENTS

| | | | |
|---|---|---|---|
| 33391 | 8/1911 | Fed. Rep. of Germany | 56/400.19 |
| 634450 | 2/1928 | France | 56/400.19 |

Primary Examiner—Gene Mancene
Assistant Examiner—John G. Weiss
Attorney, Agent, or Firm—Guy E. Matthews

[57] ABSTRACT

An improved windrow yard rake useful for the raking of leaves, garden debris and the like. The rake has an adjustable drawbar to allow for the angling of the partially cylindrical main rake body so that the accumulated debris will circulate to the outermost end of the rake relative to the operator. The drawbar is also vertically adjustable in order to achieve a comfortable angle of approach to the operator. Wheels are attached to the top rear corner of the main rake body in such a way that if the rake is turned over on its top the rake is easily transported by rolling it on the wheels. Four pockets are provided on the rear of the rake to allow for weighted materials to be deposited in order to increase the overall weight of the rake itself. A lid is also provided to prevent loss of weighted materials upon transporting the rake via the wheels.

8 Claims, 10 Drawing Figures

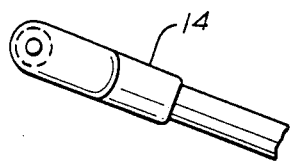
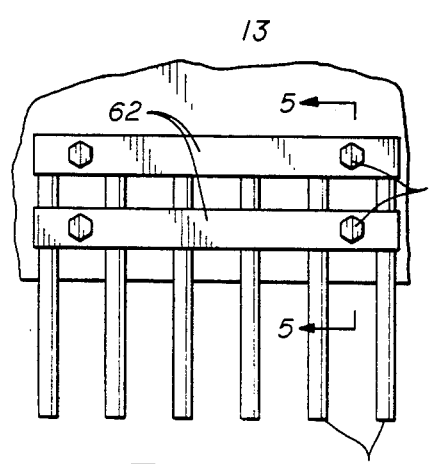
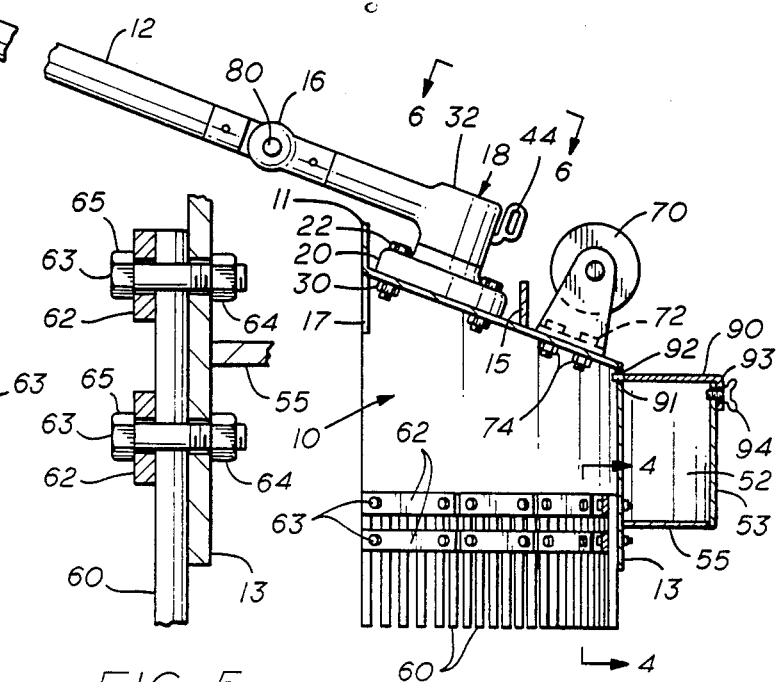
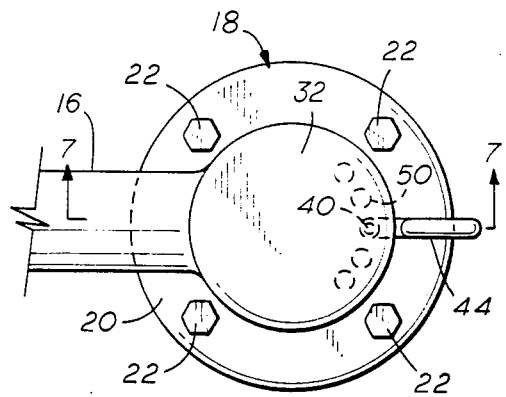
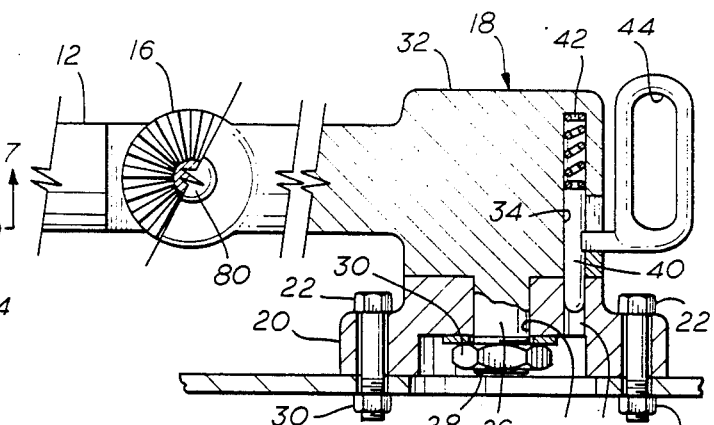
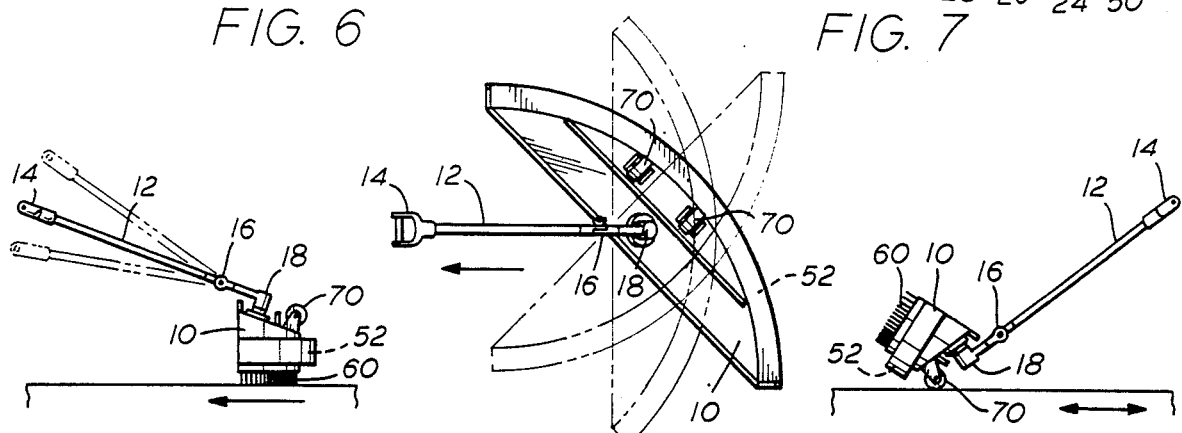

WINDROW YARD RAKE

FIELD OF THE INVENTION

This invention generally relates to an apparatus for the collection and deposit of light and bulky articles such as leaves, twigs acorns, grass and other garden debris. More particularly, the invention pertains to a novel means to rake together and deposit such debris into windrows through the use of a vertically and horizontally adjustable drawbar.

BACKGROUND OF THE INVENTION

In the raking of lawns and gardens, the operator is normally required not only to deposit the raked material into a particular place, but to apply the downward pressure required to operate the rake efficiently. This invention requires neither of the above. Due to the horizontally adjustable drawbar, the main rake body can be set at an angle greater than 90° from the drawbar and the collected materials will be deposited in a row on the far end of the rake from the operator. There is no requirement of downward pressure from the operator since pockets on the back side of the main rake body allow for the weight of the rake to be increased in accordance with the specific raking operation being carried out. The weight is increased by adding small concrete, metal or other suitable type blocks into the provided pockets.

The drawbar is vertically adjustable for the comfort of the operator. This rake can be drawn by a human, tractor or any other suitable means. Additionally, wheels are attached to the top rear corner of the rake, allowing for easy mobility after use by turning the rake over onto the wheels.

Rakes have long been used to minimize the effort required to clear a yard or area of debris. A rake generally consists of a rigid straight handle connected to a flat, planar surface from which tines protrude downwardly. The tines, being the elements that pick up or move the debris, are normally set at a fixed angle relative to the handle. Generally, the rake is pulled along with a downward force in order to efficiently use the tool. Additionally, the debris must be guided toward a certain area for later collection. Several rakes that utilize one or more of the above elements are described below.

DESCRIPTION OF THE PRIOR ART

U.S. Pat. No. 889,656 relates to a rake which is similar to the majority of rakes used today. This patent provides for a rake with a long rigid cylindrical handle, a "rake head" set permanently at an approximate 180° angle to the handle, and tines fixedly attached underneath.

McFadden U.S. Pat. No. 1,715,613 claims a rake attachment. This attachment enables one to gather and hold the debris and carry it to a desired dumping place where it may be released. The attachment is claimed for rakes such as the one described above that are comprised of a rigid cylindrical handle and a permanently fixed rake head.

Kool U.S. Pat. No. 2,069,958 is an implement to condition lawns. This implement's purpose is to set up the blades of the grass so as to admit light and air to their roots, and remove twigs, leaves, withered grass and other foreign matter. The tines are fixedly attached to the bottom of the rake body and weight of said rake body remains at a constant. Additionally, the angle of the rake body relative to the handle is nonadjustable.

McKenzie U.S. Pat. No. 2,146,264 is to be used for breaking up the surface portion of cultivated soil. This rake has a relatively short rigid handle with the rake "head" being fixedly attached at a ninety degree angle to the handle. This rake does not allow for the collection of grass or other debris but rather breaks up the ground to allow for absorption of moisture and air to facilitate healthy plant growth.

Rendin U.S. Pat. No. 4,150,528 discloses a tine frame with a handle and means for adjusting and adapting the length, and accordingly the flexibility of the metal tines, to the desired overall stiffness. The handle is vertically adjustable, thus enabling one to move the entire straight handle shaft either up or down.

Rakes are a common and useful part of yard and grass maintenance. However, the above cited inventions fail to provide some of the basic new and useful functions of the present invention. Not one of the cited prior art patents allows for horizontal adjustment of the main rake body or rake "head" in order for the grass or debris to be shifted into windrows. Additionally, none of the rakes, save one, allows for vertical adjustment of the handle and the one so allowing requires the adjustment to be made at the bottom of the shaft and not at the conducive point approximately 8 inches above the connection of the crowbar and the main rake body.

OBJECTS OF THE INVENTION

It is therefore an object of this invention to provide, as an article of manufacture, a novel and improved windrow yard rake.

Another object of this invention is to provide a novel and improved method of altering the weight of the rake to a desired amount which fully eliminates the need for the rake operator to apply a downward force.

Another object of this invention is to provide a novel and improved windrow yard rake and methodC of collecting yard debris which fully eliminates the disadvantage of known constructions of such a device and their associated methods of collecting debris.

Another object of this invention is to provide a novel and improved method of handle adjustment enabling the operators to adjust the handle vertically for the utmost comfort and horizontally for any desired windrow effect.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps, processes and improvements herein shown and described.

SUMMARY OF THE INVENTION

Briefly described, the adjustable weighted windrow yard rake of the present invention is characterized by a main rake body. A rear member attached to the front member forms a partially cylindrical section. A top to the body is also attached leaving the bottom and front open. A draw bar is attached to the top of the main rake body to allow for pulling the rake. A support member is attached horizontally to the top of the main rake body to provide additional support to the rake body top. The drawbar is attached to the top of the rake frame by a means designed such that the drawbar rotates about the point of connection with the main body. The hub is characterized by a baseplate fixedly attached to the main body and defining a plurality of holes disposed on a radius around the center of the plate. A shaft extending downward from a hub is extended through the center of the baseplate and attached underneath to allow free rotation of the drawbar. The hub carries a pin that may be depressed into the baseplate holes allowing the drawbar to be set at a selected angle for the desired windrow effect. The windrow effect is caused by adjusting the rake body so that the angle of the outer edge of the rake body, relative to the drawbar, is ninety degrees or more. This allows the accumulated debris to circulate to the outermost end of the rake for deposit in a windrow. Attached to the rear of the main rake body are four pockets that may be filled with rocks, cement, dirt, or other material in order to increase the weight of the rake relieving the operator from applying downward pressure to operate the rake. Additionally a lid is provided to prevent the loss of the weighting materials when the rake is being transported by the wheels attached to the top of the rake.

BRIEF DESCRIPTION OF THE DRAWINGS

FIG. 3 is a side elevational view showing a rake constructed in accordance with the present invention.

FIG. 4 is a section taken along 4—4 in FIG. 3, to a larger scale, and showing a portion of the main rake body with the tines and the means for securing said tines to the main rake body.

FIG. 5 is a section taken along 5—5 in FIG. 4.

FIG. 6 is a view taken along 6—6 in FIG. 3 to a larger scale and showing the means of adjusting the drawbar horizontally.

FIG. 7 is a sectional view taken along the line 7—7 of FIG. 6 showing internal details of means of vertical and horizontal drawbar adjustment.

FIG. 8 is a side elevation view showing the vertical drawbar adjustment means in operation.

FIG. 9 is a plan view showing the means of horizontally adjusting the drawbar.

FIG. 10 is an elevation view showing the implement inverted and running on its wheels.

DESCRIPTION OF THE PREFERRED EMBODIMENT

Figure 2:
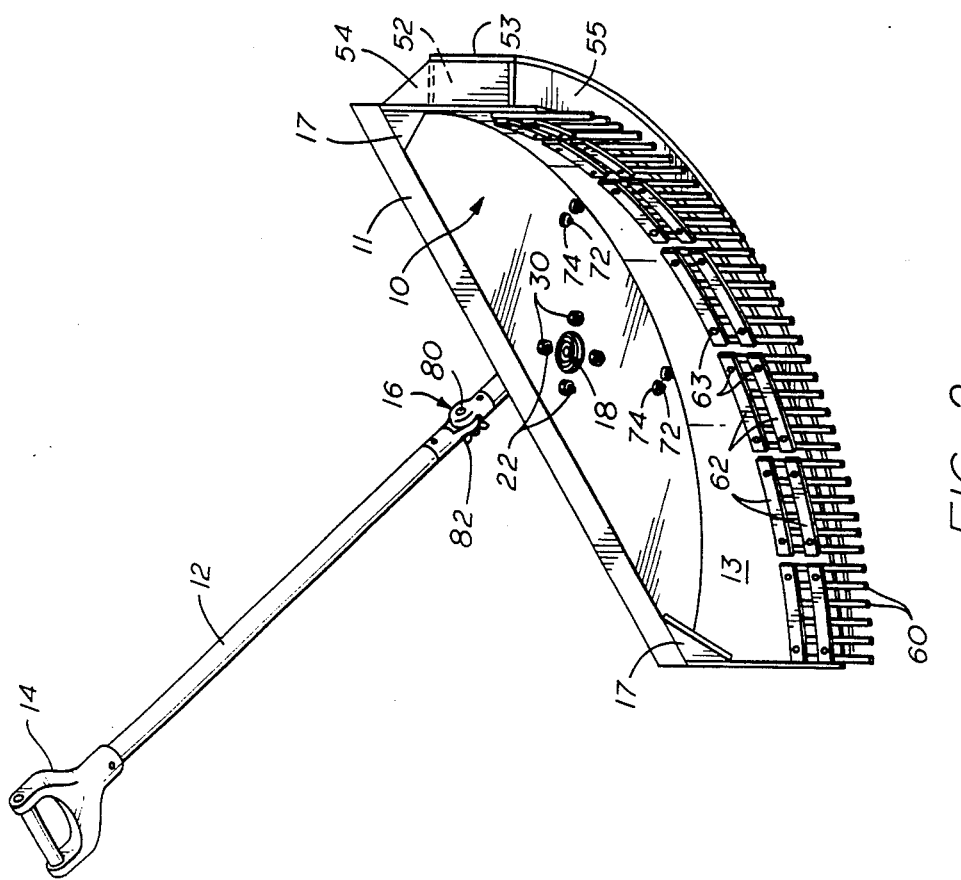
FIG. 2 is an elevational prospective view of the windrow yard rake of this invention as inverted.
Figure 1:
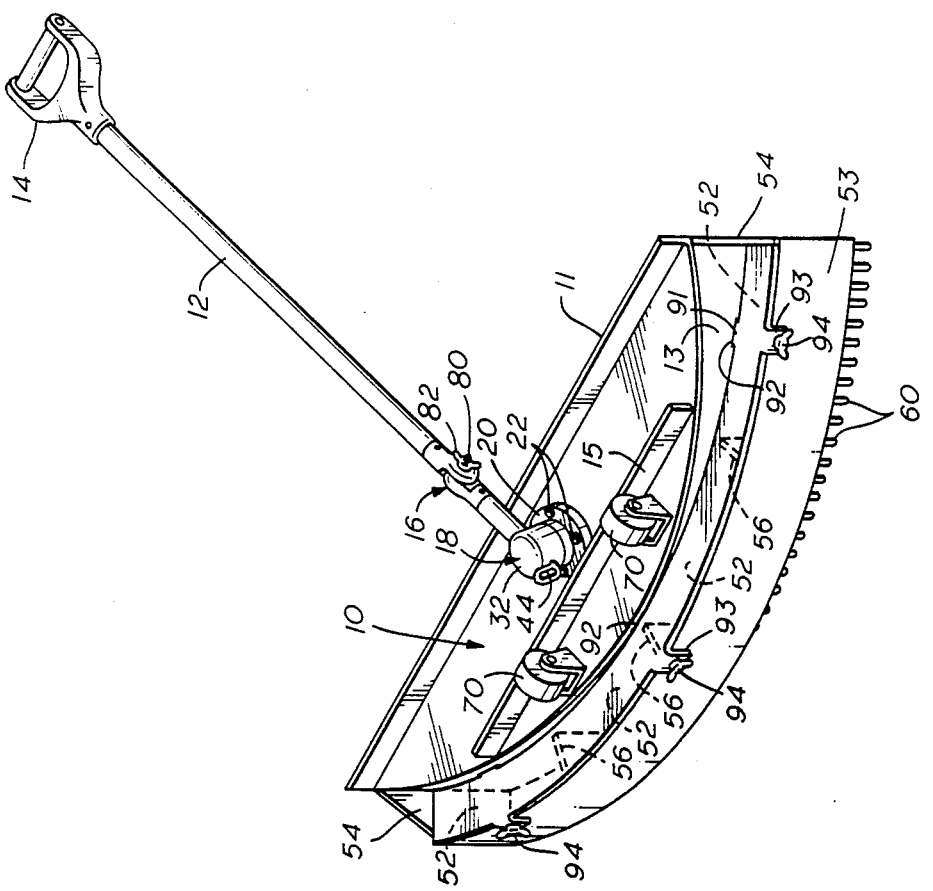
FIG. 1 is an elevational perspective view of the windrow yard rake of this invention.

FIG. 1 illustrates a rake which requires no downward pressure and allows for both vertical and horizontal adjustment of the main rake body 10. The main rake body is comprised of a solid front member 11 and an arcuate rear member 13 attached fixedly to the front member a draw bar 12 extends outwardly from the rake body. and has a handle 14 attached fixedly to its distal end. The drawbar shaft 12 is attached to the main rake body through a device 16 for adjusting the horizontal angle of the drawbar shaft 12 in relation to the main rake body 10. Additionally, a device 18 is located at the base of the drawbar shaft 12 which allows for vertical adjustment of said shaft 12.

FIGS. 6 and 7 clearly present the drawbar horizontal angle adjuster 18. The adjuster baseplate 20 is secured by four threaded fasteners of screws 22, which fix the adjuster baseplate 20 to the main rake body 10. A circular hole 24 through the center of the base plate receives the shaft 26. This shaft is threaded at its base 28, such that a nut 30, can be used to secure the hub 32 to the baseplate 20.

FIG. 7 illustrates the internal details of the means of adjusting the drawbar horizontally and vertically. A pin 40, is disposed in a slot 34 within the hub 32 opposite to the point of connection of the drawbar. Shaft 12 to the hub. The pin 40 remains in a constantly extended position due to the downward pressure exerted on the top of the pin by the spring 42. The means to lift the pin 42 is a fingerhole 44.

FIGS. 1 and 7 illustrate the means of vertical adjustment 16 of the drawbar shaft 12. The means is comprised of a two-part cylindrical drawbar shaft, the two parts being connected by a bolt 80 and wingnut 82 which can be tightened down to prevent any change of adjustment after obtaining the desired angle.

FIG. 6 illustrates a plurality of holes 50 defined in the baseplate 20 and extending on a radius around the center of the baseplate such that the pin 40 may be inserted into a selected one of the holes in order to fix the baseplate hub 32 and drawbar shaft 12 at the desired angle between the drawbar and the main rake body 10. Adjusting the baseplate hub 32, and accordingly the drawbar shaft 12, results in the creation of windrows, due to the angle of the main rake body 10 with respect to the drawbar shaft 12. FIG. 9 shows in solid lines the rake adjusted to an angle such that it will produce the windrow effect.

FIG. 1 illustrates four (4) pockets 52 positioned on the rear of the main rake body 1. The pockets 52 are attached to the rear of the main rake body with a single rear portion 53, sides 54, bottom 55, and subdivided into four (4) pockets by dividers 56. The pockets are capable of being filled with small concrete blocks, rocks, dirt, metal or other suitable material to increase the weight of the rake, thereby to allow for optimum raking effect on the grass. To prevent the materials in the pockets from spilling out when the rake is inverted for transporting the rake on its wheels. A lid 90 is provided. The lid is secured in place by means of integral ears 91 which are received within slots 92 or rear member 13 and by bracket 93 and cooperating wingbolt 94.

FIG. 3 displays the rake tines 60 and the means of connecting the times to the main rake body. Fixedly attached to the bottom rear portion of the main rake body are a plurality of cylindrical tines 60, that perform the actual gathering of the leaves and other garden or yard debris. The tines 60, are held in place by two parallel braces 62 approximately one-half of an inch in width. The tine braces 62 are fixedly attached to the bottom rear portion of the main rake body by means of a plurality of threaded fasteners such as bolts 63 and nuts 64 set equidistance apart. The screws are inserted with the bolt heads 65 placed flat against the tine braces 62 while the nuts 64 are attached to the threads of the bolts 63 such that the nuts are outside the main rake body. This is clearly demonstrated in FIG. 5 which illustrates a cross-sectional view of the bolts, nuts, rake body, tine and tine brace.

FIG. 3 also illustrates two wheels 70 attached by nuts 72 and bolts 74 to allow for easy mobility of the rake by inverting the rake so that the wheels will movably support the rake. FIG. 10 illustrates the rake inverted and moving on its wheels.

A brace 15 is attached across the top of the main rake body 10 to increase the stability and firmness of the top member of the main rake body. Two additional triangular braces 17 are attached to the front top corners of the main rake body also to increase the stability of the invention.

FIG. 8 illustrates the rake and the vertical drawbar adjustment feature in use.

While certain features of the present invention have been described in conjunction with the preferred embodiments above, it is to be understood that modifications and variations may be made, all without departing from the spirit and scope of the invention, as those skilled in the art would readily understand. Such modifications and variations are considered to be within the purview and scope of the invention and amended claims.

What is claimed is:

1. An adjustable windrow rack comprising:
   (a) a body of sheet metal or other suitable material, said body comprising a rectangular front member, an arcuate rear member, and a top member, said members defining front, rear and top surfaces, respectively;
   (b) a draw bar attached to said top member, said draw bar having a first adjusting means for adjusting said draw bar horizontally and a second adjusting means for adjusting said draw bar vertically; and
   (c) a plurality of tines attached to and extending downward from the bottom of said rear member.

2. The adjustable windrow rake of claim 1 wherein said first adjusting means comprises:
   (a) a circular plate attached to said top surface, said plate defining a plurality of holes disposed on a partial circle equi-distant from the center of said plate;
   (b) a hub attached to one end of said draw bar, said hub being rotatably secured to said plate, the axis of rotation of said hub passing through the center of said plate, said hub defining a receptacle for a vertical pin, said receptacle disposed a distance from said axis equal to the radius of said partial circle;
   (c) a pin disposed within said receptacle such that said pin may extend downward to engage one of said holes;
   (d) a spring disposed above said pin, the combined length of said pin and said spring in compression being shorter than said receptacle to allow retraction of said pin into said receptacle, said spring applying pressure downward on said pin to retain said pin in said hole; and
   (e) a pulling means attached to said pin to retract said pin upward into said receptacle to disengage said pin from said hole.

3. The adjustable windrow rake of claim 1 wherein said draw bar comprises:
   (a) a first straight cylindrical shaft having an attachment end and a free end, said shaft being fixedly attached to said body at said attachment end by said first adjusting means; and
   (b) a second straight cylindrical shaft having a handle attached to one end, and said shaft being attached to said free end by said second adjusting means.

4. The adjustable windrow rake of claim 3 wherein said second adjusting means comprises a bolt disposed through each of said shafts and a wingnut threadedly connected to said bolt such that said wingnut may be loosened to allow vertical adjustment of said second shaft and tightened to secure said second shaft in the selected vertical position.

5. The adjustable windrow rake of claim 1 wherein a supporting member is attached horizontally to said top to provide additional strength and support.

6. The adjustable windrow rake of claim 1 wherein two wheels are attached to the top surface of said body such that said rake may be turned over and easily transported.

7. The adjustable windrow rake of claim 1 wherein a plurality of pockets are fixedly attached to said rear member for the purpose of holding additional weight.

8. The adjustable windrow rake of claim 7 wherein a lid is provided to retain the additional weight when said rake is turned over and transported by said wheels.

* * * * *